Jan. 31, 1939.                M. BRITT                2,145,338
                        FRUIT JUICE EXTRACTOR
                         Filed Feb. 18, 1938
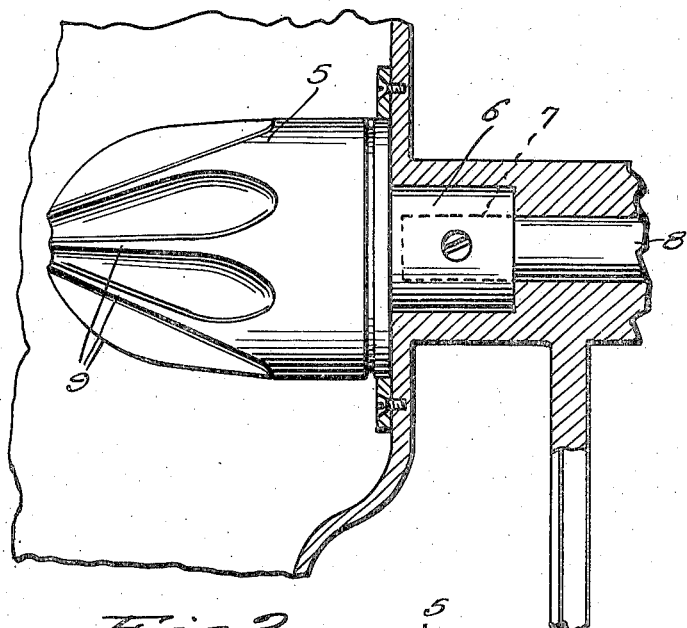
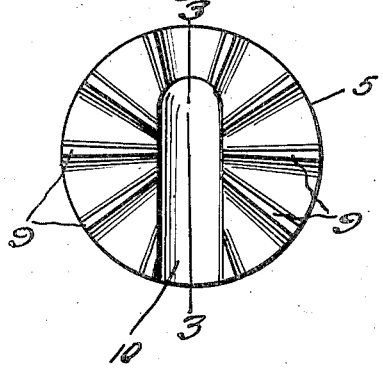
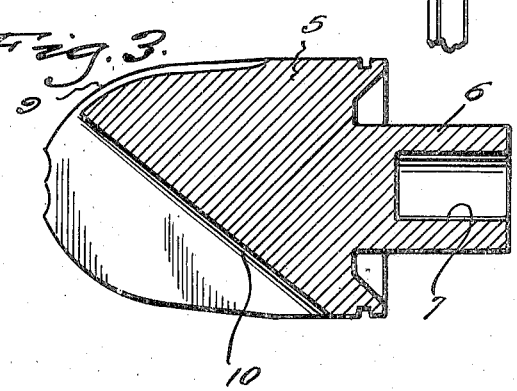
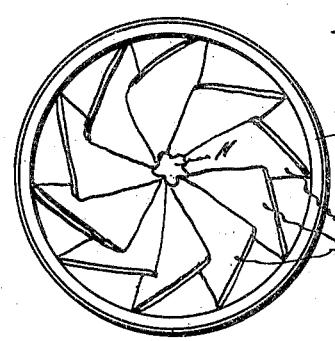
Inventor
Mark Britt
By *Clarence A. O'Brien*
   *Hyman Berman*
Attorneys

UNITED STATES PATENT OFFICE 2,145,338

FRUIT JUICE EXTRACTOR

Mark Britt, Richmond, Va.

Application February 18, 1938, Serial No. 191,343

1 Claim. (Cl. 146—3)

This invention relates to means for extracting juices from fruit or the like and particularly to fruit-juice extractors of the type in which the juice is extracted by relative rotation between a dome-like head or reamer and half an article of fruit, such as an orange, lemon, or the like placed thereon.

An object of the present invention is to provide an improved head or reamer so constructed as to insure thorough extraction of the fruit juice free of the oil contents of the skin of the fruit.

As is well-known, the skin of citrus fruit contains a certain amount of oil which, generally when extractors now known are employed, is, together with the juice of the fruit taken therefrom. Consequently, this oil which has a deteriorating effect on the juice causes the juice, after it is permitted to stand for any length of time, to become contaminated thereby thus materially detracting from the taste as well as the health value of the juice.

In accordance with the present invention a head or reamer is provided which will so operate on the fruit as to cause the "rag" or cell walls to be beaten back against the interior of the skin forming as it were a protective wall for the skin and precluding the skin being cut or otherwise acted on by the reamer as would result in the oil being drawn from the skin during the juice-extracting operation.

Further in accordance with the present invention a reamer is provided that is so constructed as to insure against the core of the fruit being torn away from the skin to the end that only the juice and the pulp will be extracted, the core and the aforementioned "rag" or cell walls being left remaining within the half of the fruit from which the juice has been extracted.

The invention together with its objects and advantages will be best understood from a study of the following description taken in connection with the accompanying drawing wherein:—

Figure 1 is an elevational view showing the improved head or reamer,

Figure 2 is an end elevational view of the reamer,

Figure 3 is a sectional view taken substantially on the line 3—3 of Figure 2, and Figure 4 is a plan view of a half of citrus fruit, as the same appears after the juice has been extracted therefrom with a reamer embodying the features of the present invention.

Referring to the drawing more in detail, it will be seen that in accordance with the present invention the bit or reamer comprises a substantially dome-shaped head 5 which may be formed of metal or other suitable material and which is preferably solid; together with an integral shank 6 provided with a socket or otherwise as at 7 to receive one end of a shaft 8 forming part of any suitable or well-known type of either hand or mechanical juice extractor.

The head 5, as is more or less conventional, is provided on its outer surface with a plurality of edges 9 extending from its highest point or apex to a point inwardly from the base end thereof as shown.

The salient feature of the present invention, however, resides in providing the head 5 with a slot or groove 10 that opens through the periphery of the head and extends diagonally of the head as clearly shown in the drawing. The purpose of the slot 10 is to accommodate the core 11 of the fruit 12 in such a manner as will leave the core 11 integral at one end thereof with the skin of the fruit, and at the same time prevent crushing of the core 11 during the juice extracting operation. By so leaving the core in this manner, no oil will be caused to exude therefrom.

Also, by making such provision for the reception of the core 11 the core will be held in such a manner that the ribs or teeth 9 will serve to sever the "rag" or cell partitions 13 from the core 11 and as these cell partitions 13 are so separated from the core 11 the said cell partitions or "rag" will by the action of the head be pressed back against the interior of the skin or wall of the fruit thus providing, as it were, a protective lining for the wall of the fruit against the action of the ribs 9 to the end that these ribs will not come into direct contact with the wall or skin of the fruit and consequently the reamer head will have no such action on the wall or skin of the fruit as to beat or otherwise cause the oil in the skin to exude therefrom during the juice-extracting operation, the cells or "rag" thus folding back against the interior of the skin or wall of the fruit providing a padding for the interior thereof and, as above stated, thereby effectively protecting the wall against the action of the reamer head.

Thus it will be seen that with a reamer head embodying the features of the present invention the juice and pulp will be extracted from the fruit without the possibility of any of the oil from the skin being extracted therewith to the end that the juice in substantially a pure form is extracted from the fruit and consequently the juice so extracted will be free of the deteriorating effect of such oil.

It is thought that a clear understanding of the construction, utility and advantages of a fruit-extractor reaming head or bit embodying the features of the present invention will be had without a more detailed description thereof.

Having thus described the invention what is claimed as new is:—

A fruit reamer comprising a conical-shaped body including a pointed end to be contacted by pulp and core of a piece of fruit and a base portion, means for rotatably supporting the body, ribs formed on the body and extending longitudinally thereof from said pointed end towards the base portion and in diverging relation to each other, said body having a slot extending through the pointed end of said body with ends of the ribs meeting said slot whereby a core of the fruit may be received therein and permit the ribs to sever from the core pulp cells and bring about mashing of the cells against the skin of the fruit to protect the skin from being severed during the rotation of the body with the fruit forced thereagainst, said slot having the bottom wall thereof extending from one side of the body adjacent the pointed end thereof to the opposite side of the body adjacent the base portion of said body.

MARK BRITT.